INVENTOR.
JAMES L. FLANAGAN

J. L. FLANAGAN 2,938,079

SPECTRUM SEGMENTATION SYSTEM FOR THE AUTOMATIC EXTRACTION
OF FORMANT FREQUENCIES FROM HUMAN SPEECH

Filed Jan. 29, 1957

VOWEL SEGMENTER

INVENTOR.
JAMES L. FLANAGAN
BY
ATTORNEYS

INVENTOR.
JAMES L. FLANAGAN

INVENTOR.
JAMES L. FLANAGAN
ATTORNEYS

United States Patent Office 2,938,079
Patented May 24, 1960

2,938,079

SPECTRUM SEGMENTATION SYSTEM FOR THE AUTOMATIC EXTRACTION OF FORMANT FREQUENCIES FROM HUMAN SPEECH

James L. Flanagan, Cambridge, Mass., assignor to the United States of America as represented by the Secretary of the Air Force Filed Jan. 29, 1957, Ser. No. 637,041

4 Claims. (Cl. 179—15.55)

This invention relates to a speech analyzer for a formant-coding compression system and, more particularly, to an automatic formant extractor for continuous human speech.

Practically every voice communication channel in operation today involves "waveform transmission." Yet, during the past two decades, the results of psychophysical experiments and information theory have shown that waveform transmission is a highly inefficient means for the transmission of information. This is because investigations in speech reproduction show that exact preservation of the waveform is not necessary for speech to remain intelligible. At a matter of fact, it has been shown that speech is highly resistant to very severe non-linear distortions of waveform, such as peak clipping, time quantization and severe time scale distortions. The results of this research suggest that intelligible speech can be transmitted over a communication channel having a sharply reduced or compressed bandwidth.

Further studies have shown that the shape of short-time spectrum of the speech waveform together with voiced-unvoiced data comprise most of the information contained in speech. Experiments performed with vowel sounds synthesized from quantized spectral patterns have indicated that the frequencies of the major spectral maxima, known as the formants, generally provide an adequate description of the spectra of the vowel sounds. On the basis of these results, formants appear to constitute a means for specifying the spectra of vowel sounds with a small number, probably two or three, of slowly varying parameters.

Analytical considerations of the human vocal tract also indicate that the formants are in effect information bearing elements. Acoustic analysis shows that for vowel production, specification of the natural modes of vibration of the vocal tract and specification of the tract excitation is equivalent to the specification of the acoustic output. The formant frequencies are closely related to the natural frequencies of the vocal system since they are manifestations of the resonance phenomena of the cavities in the mouth, throat and nose. It has been demonstrated that the specification of the tract excitation and formant frequencies described not only the short-time spectrum of speech, but very nearly the waveform of the acoustic output. This suggests that if signals representing the formant frequencies can be automatically and continuously extracted from speech, they can be used as controls for speech synthesizers. Qualitative observations have indicated that synthesizers controlled by formant signals are capable of speech bandwidth reductions of the order of 50:1 and still preserve a certain amount of naturalness and quality. Such synthesizers are capable of producing fairly intelligible speech when they are controlled by electrical signals that represent:

(1) The first three formant frequencies, as they vary with time.

(2) The amplitude of voicing excitation of the vocal tract.

(3) The amplitude of noise or fricative excitation of the vocal tract.

(4) The fundamental vocal frequency or pitch.

Therefore, the principal object of this invention is to provide a speech analyzer with a device for extracting formant frequency control signals from continuous input speech.

This and other objects of this invention will become more apparent when read in the light of the specification and the accompanying drawings wherein:

Fig. 10 is a circuit diagram of the electronic switch used with the vowel segmenter.

Figure 1:
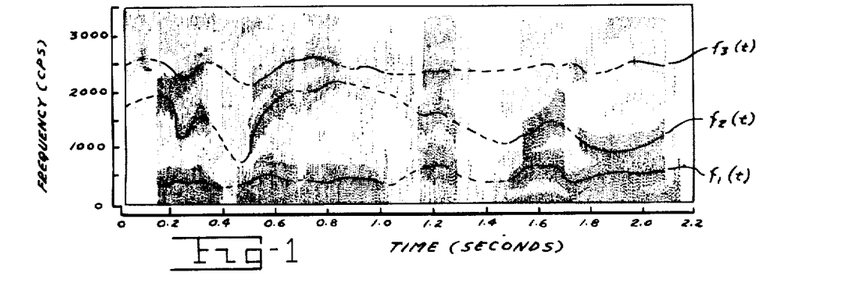
Fig. 1 is a wide band spectrogram of human speech disclosing the control curves of the three formant frequencies and their variation in time.
Figure 2:
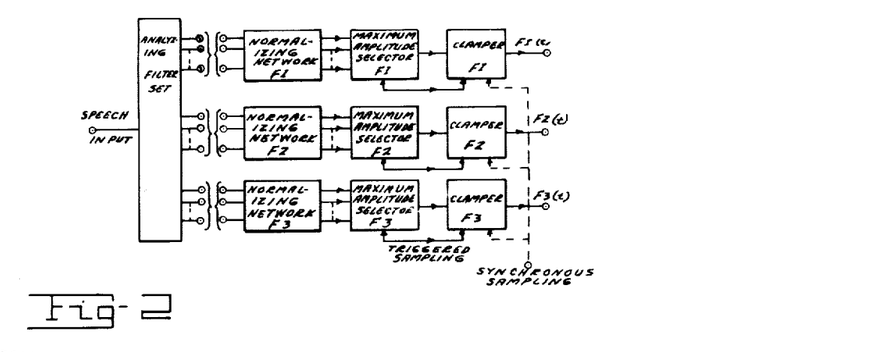
Fig. 2 is a block diagram of the spectrum segmentation system for automatic formant extraction.

Referring now to Fig. 1, it is seen that the wide band spectrogram of human speech exhibits three or more darkened regions in spaced relationship with respect to the frequency. These darkened regions correspond to vowel resonances or wave reinforcements known as the basic formants of speech. It is noted that the frequency and strength of the these regions vary relatively slowly with time because of changes in the sizes and shapes of the vocal cavities during speech. The three lines designated $f_1(t)$, $f_2(t)$ and $f_3(t)$ in the diagram have been drawn to follow the first three formant regions. The lines represent, therefore, the first three formant frequencies, as functions of time, for the speech utterance depicted in the spectogram. If by some means (to be described herein) electrical signals exactly proportional to $f_1(t)$, $f_2(t)$, and $f_3(t)$ can be obtained, then these signals can be used to control a speech synthesizer. As seen in Fig. 2, this entire apparatus is devoted to continuously extracting the three formant frequency control signals designated as $F_1(t)$, for the lowest or first formant, $F_2(t)$, for the second formant and $F_3(t)$, for the third formant.

Figure 3:
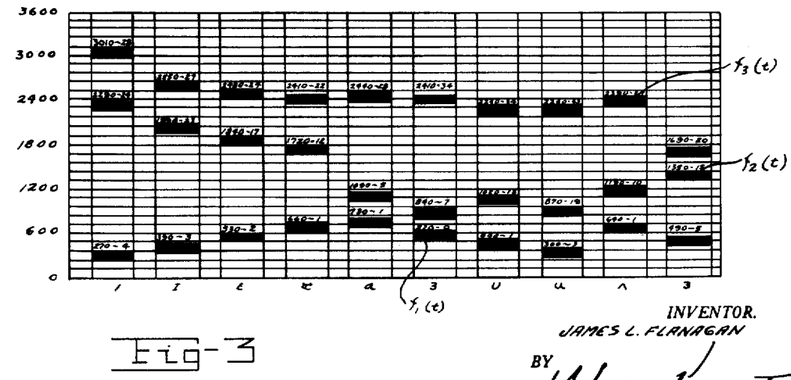
Fig. 3 is a chart showing the frequencies in c.p.s. and relative intensity in db of the first three formant of ten different vowels.

Referring to Fig. 3, a chart is disclosed showing the frequency in c.p.s. of the first three formants of ten English vowels. The data represents the average speech for 33 adult male speakers. It is apparent that the three formants occupy frequency ranges which do not on the average overlap. It can be seen that a clean division can be made between $F_1(t)$ and $F_2(t)$ at approximately 800 cycles. The division between $F_2(t)$ and $F_3(t)$ is not quite so definite. A division at 2280 c.p.s. would result in some overlap for the two extreme sounds, very slight for /i/, but appreciable for the /3/. However, for the /3/ sound, $F_2(t)$ and $F_3(t)$ are in close proximity, and the two formants could probably be approximated as one resonance with a chance that the sound would not be misidentified.

On the basis of these facts, the formant tracking system was developed by segmenting the speech spectrum into three ranges or groups to isolate $F_1(t)$, $F_2(t)$, and $F_3(t)$ from each other. The frequency constraints imposed are:

(1) the first formant will fall below 800 c.p.s.
(2) the second formant will fall between 800 and 2280 c.p.s.
(3) the third formant will fall above 2280 c.p.s.

As can be seen by the block diagram of Fig. 2, the speech input is fed into an analyzing filter set. This filter set is composed of 36 contiguous bandpass filters all having a common input and separate outputs. These bandpass filters are divided into three groups, each containing ideally a formant of the input speech. As seen in the circuit diagram of Fig. 4, each channel of the filter set includes a simple tuned circuit, an amplifier, a full wave rectifier, and a smoothing network having a time constant of approximately 10 milliseconds. Selection of the bandwidth and center frequency of each channel was guided by psychoacoustic experiments. As a result of these experiments, the channels of the analyzing filter set were designed with circuit values given in the table below. These filter channels are set up on a Koenig frequency scale extending from 150 c.p.s. to 7000 c.p.s. increasing logarithmically above 1550 cycles. The adjacent channels overlap at their half power frequency, see Fig. 5. The maximum output of each filter channel is ±30 v. D.C. The smoothing time constant of 10 milliseconds was chosen as the maximum time resolution necessary because this corresponds to the average male vocal period and minimum duration of speech sounds. The variable resistance $R_2$ in the circuit of Fig. 4 provides a means for adjusting the bandwidth of the filter channel, while the variable IM potentiometer provides a gain adjustment for the channel.

Figures 4, 5, 6:
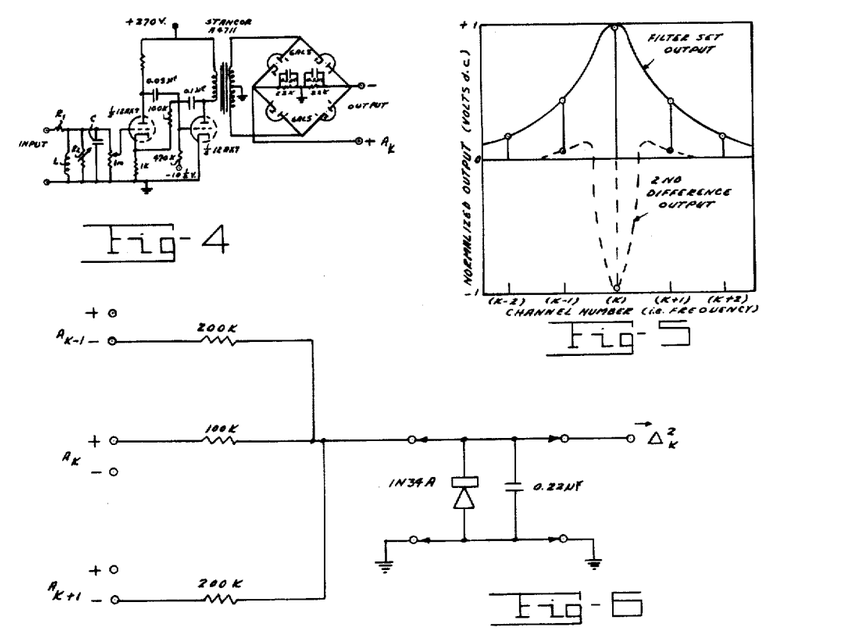
Fig. 4 is a circuit diagram of a typical channel of the analyzing filter set of the formant extractor.
Fig. 5 is a diagram illustrating the improvement of the frequency resolution of the filter set by a double differentiation of the spectrum with respect to the frequency.
Fig. 6 is a network yielding the second difference output or second derivative output of one filter channel.

Referring to Fig. 5, the upper curve of the diagram represents the output of the filter channels when a single frequency input is applied to the filter set. This curve has the general shape of a single tuned resonance. Two differentiations of the upper curve with respect to frequency produce the lower or dotted curve which as seen represents a sharper resolution of the input. This second derivative can be approximated by taking the second differences of the filter outputs. For example, positive second difference output of the Kth channel is $$\Delta_k^2 = (-A_{k+1} + 2A_k - A_{k-1})$$

where $A_k$ is the output amplitude of the Kth filter channel. Since each filter channel provides both positive and negative outputs (see Fig. 4) the second difference for each channel can be computed easily by a resistive network (see Fig. 6). It can be seen by differences in sign in the input in the circuit of Fig. 6 that the output voltage will be actually the second difference $$\Delta_k^2$$

as defined above. The clamping diode in the circuit constrains the second difference to unipolar values (positive for the connection shown in Fig. 6).

Figure 7:
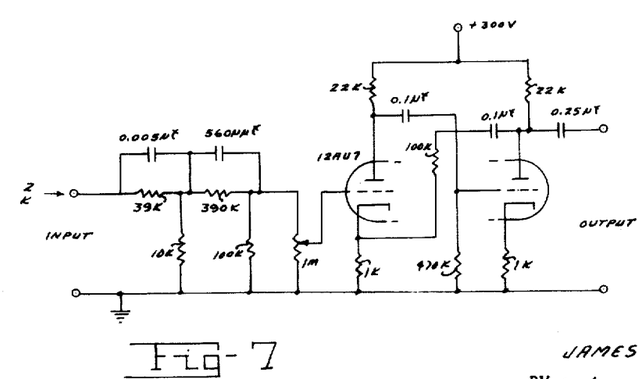
Fig. 7 is a circuit diagram for the preemphasis network and the driver amplifier for the analyzing filter set.

Since the speech spectrum, on the average, slopes downward at about 10 db per octave, it is desirable to perform a frequency equalization to permit all of the filter channels to operate at approximately the same signal level. This is done by using the simple resistance capacitance filter in the left portion of Fig. 7. This equalization yields a spectral output from the filter set in which all of the maxima are at approximately the same amplitude. This alleviates some of the dynamic range problems in the succeeding formant analyzing equipment. Since the filter set requires a maximum input voltage level of 10–15 v. R.M.S. and has an input impedance of approximately 5 kilohmns, it is desirable to have a driver amplifier as an integral part of the filter set. This simple feedback amplifier is seen in the right hand portion of Fig. 7.

Reserch studies of the speech spectrum show that the formants usually are well defined only for vowel sounds. If the machine analysis is restricted only to the vowel portions of the input speech, the problem of smoothly extrapolating the formant signals across the silent and unvoiced intervals is considerably alleviated. It is desirable, therefore, vowel segmenting device at the input of the filter set to permit only the vowel sounds of the continuous speech input to pass into the analyzing system.

Figure 8:
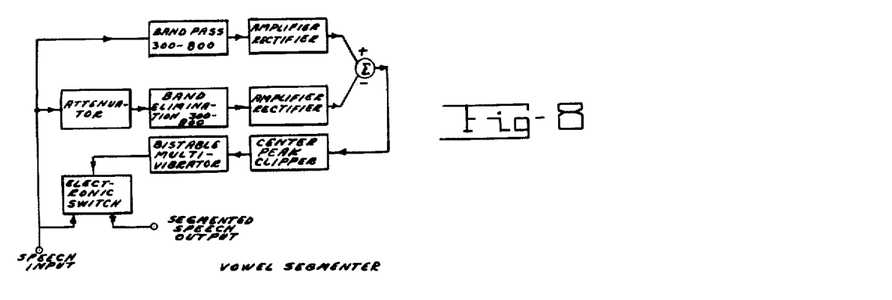
Fig. 8 is a block diagram of the vowel segmenter.
Figure 9:
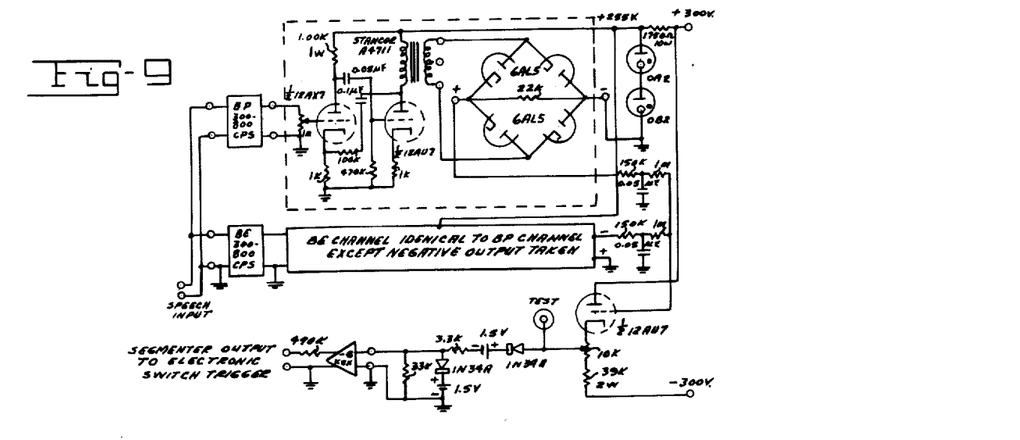
Fig. 9 is a circuit diagram of the vowel segmenter.

A vowel segmenting apparatus, see Figs. 8, 9 and 10, has been developed and arranged for optional use at the input to the filter set. Operation of the segmenting circuit is based upon comparing the speech energy in a band 300 to 800 c.p.s. with this energy outside the band, weighted by a constant factor. Vowel sounds usually have high ratio of energy in the 300 to 800 c.p.s. band (i.e., the lowest frequency formant region), to the energy outside this band, whereas consonants usually have a low ratio of these energies.

A block diagram of the vowel segmenting circuit is shown in Fig. 8. Speech is fed into the parallel 300 to 800 c.p.s. bandpass, band elimination channels. Each channel includes an amplifier, rectifier and smoothing network. The smooth rectified outputs of both bands are subtracted in a resistive network and the difference is sent into a peak and center clipper. The clipper is employed to act as a threshold circuit. The clipped difference is used to trigger a bistable multivibrator (see the lower left portion of Fig. 10), which in turn gates a

| Filter Channel Number | Center Frequency $f_0$ (c.p.s.) | Bandwidth (c.p.s.) | $Q = f_0/BW$ | L (henries) | $R_1^*$ (kilohms) | $R_2^{**}$ (kilohms) |
|---|---|---|---|---|---|---|
| 1 | 150 | 100 | 1.5 | 5.0 | 62 | 7.1 |
| 2 | 250 | 100 | 2.5 | 3.0 | 100 | 11.7 |
| 3 | 350 | 100 | 3.5 | 2.0 | 130 | 15.4 |
| 4 | 450 | 100 | 4.5 | 2.0 | 220 | 25.4 |
| 5 | 550 | 100 | 5.5 | 1.25 | 200 | 23.8 |
| 6 | 650 | 100 | 6.5 | 1.25 | 330 | 37.8 |
| 7 | 750 | 100 | 7.5 | 1.25 | 390 | 44.1 |
| 8 | 850 | 100 | 8.5 | 0.75 | 300 | 34.0 |
| 9 | 950 | 100 | 9.5 | 0.75 | 360 | 42.5 |
| 10 | 1,050 | 100 | 10.5 | 0.75 | 430 | 52.0 |
| 11 | 1,150 | 100 | 11.5 | 0.75 | 560 | 62.3 |
| 12 | 1,250 | 100 | 12.5 | 0.75 | 620 | 73.6 |
| 13 | 1,350 | 100 | 13.5 | 0.50 | 510 | 57.2 |
| 14 | 1,450 | 100 | 14.5 | 0.50 | 560 | 66.0 |
| 15 | 1,550 | 100 | 15.5 | 0.50 | 620 | 75.5 |
| 16 | 1,650 | 125 | 14.7 | 0.50 | 680 | 76.4 |
| 17 | 1,775 | 125 | 14.2 | 0.50 | 680 | 79.2 |
| 18 | 1,900 | 150 | 13.8 | 0.50 | 680 | 82.4 |
| 19 | 2,050 | 150 | 13.7 | 0.30 | 470 | 53.0 |
| 20 | 2,200 | 175 | 13.5 | 0.30 | 470 | 56.0 |
| 21 | 2,375 | 175 | 13.6 | 0.30 | 510 | 60.4 |
| 22 | 2,550 | 200 | 13.6 | 0.30 | 560 | 65.5 |
| 23 | 2,750 | 200 | 13.7 | 0.30 | 620 | 71.2 |
| 24 | 2,950 | 225 | 13.9 | 0.30 | 680 | 77.0 |
| 25 | 3,175 | 225 | 14.1 | 0.20 | 470 | 56.3 |
| 26 | 3,400 | 250 | 14.3 | 0.20 | 510 | 61.0 |
| 27 | 3,650 | 275 | 13.9 | 0.20 | 510 | 63.7 |
| 28 | 3,925 | 300 | 13.9 | 0.20 | 560 | 68.5 |
| 29 | 4,225 | 325 | 13.5 | 0.20 | 620 | 71.6 |
| 30 | 4,550 | 350 | 13.5 | 0.20 | 680 | 77.1 |
| 31 | 4,900 | 375 | 13.5 | 0.125 | 430 | 52.0 |
| 32 | 5,275 | 400 | 13.2 | 0.125 | 510 | 56.7 |
| 33 | 5,675 | 425 | 13.7 | 0.125 | 510 | 61.0 |
| 34 | 6,100 | 425 | 14.4 | 0.125 | 620 | 69.5 |
| 35 | 6,550 | 475 | 14.0 | 0.125 | 620 | 72.0 |
| 36 | 7,025 | 475 | 14.8 | 0.125 | 680 | 81.6 |

*$R_1$ is computed to be approximately ten times the resonant-frequency impedance of the tuned circuit.
**$R_2$, L, and C in the circuit of Fig. 4 are computed on the basis of a resonant-frequency reactance for L and C of five kilohms.

set of four balanced amplified stages biased to act effectively as a single pole double throw switch. The input speech is sent through this switch and, depending on the particular "pole" that is chosen, the segmented vowels or the segmented consonants are obtained at the output. Figs. 9 and 10 disclose the engineering details of these conventional circuits.

Figure 11:
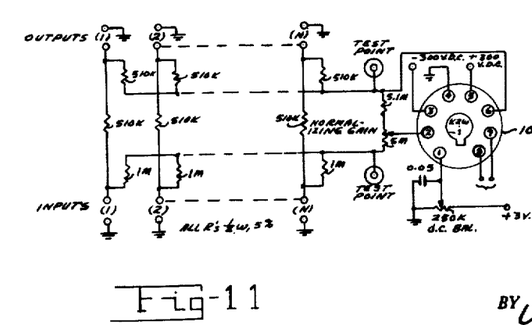
Fig. 11 is a circuit diagram of the normalizing network used in the spectrum segmentation formant extractor.

Whether or not the vowel segmenter is used before the input to the analyzing filter set, the outputs of each formant group of channels of the filter set (see Fig. 2) are sent to a normalizing network (see Fig. 11). Amplitude normalization permits reliable selection of the channel within each group having the maximum voltage output. Identification of the bandpass filter having the maximum voltage tells within the limits of the bandpass filter substantially what the formant frequency is at that instant. Each normalizing network computes the mean value of the set of its input voltages and subtracts this mean value from each member of its input set. It provides one half this difference at each corresponding output. For example, if $e_k$ is the voltage input to the normalizing circuit from the Kth filter channel of a group of channels of total number N, then the normalized Kth channel voltage is $$e'_k = \frac{1}{2}\left[e_k - \frac{1}{N}\sum_{n=1}^{N} e_n\right]$$

Figure 12:
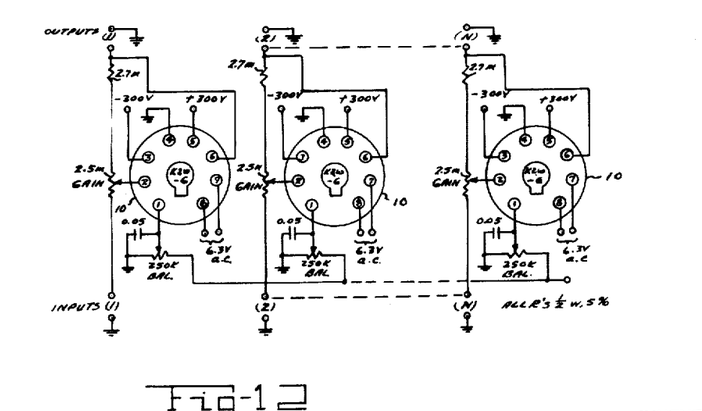
Fig. 12 is a circuit diagram of the amplifier circuits of the spectrum segmentation formant extractor.

This computation is performed by the circuit shown in Fig. 11 in the following manner: The mean value of the set of input voltages is computed by a resistive summing network; the mean voltage is then sent through an amplifier having a gain of −1 (the Philbrick plug-in K2W amplifier was selected to perform this, see Fig. 16); the negative mean is then added by means of another resistive network to each channel voltage. After leaving the circuit of Fig. 11, the normalized set of voltages are sent to the amplifiers shown in Fig. 12. These amplifier stages (Philbrick K2W units) afford a gain of the order of 10–15 and perform a polarity inversion. The set of voltages is then sent to the thyratron maximum selector circuit shown in Fig. 13. The maximum selector circuit contains a shield grid thyratron for each channel of the group, and each normalized and amplified channel voltage is connected to a corresponding thyratron control grid. The entire set of thyratron selectors has a common plate voltage load resistor and is simultaneously enabled and disabled by effectively switching the plate supply voltage on and off at a rate of 60 times per second. The thyratron having the maximum positive grid voltage fires when the set is enabled. Since the set has a common plate load, the firing of one tube precludes the firing of any other tube during the enabling time. The cathode of each thyratron is connected to a potentiometer from which the output is taken. Each potentiometer is set so that its output voltage when its tube fires is proportional to the frequency of the channel it is monitoring or else proportional to some desired frequency calibrating function. All the potentiometer arms are led to a resistive summation network which provides a single common output. The selector output voltage is, therefore, a string of rectangular pulses whose heights correspond to the number of frequency of the channel selected as having the maximum output. The pulse heights therefore represent the frequency of the formant within the segmentation limits imposed. Any single valued calibrating function of formant frequency versus pulse amplitude can be set up on the cathode potentiometers.

Figure 15:
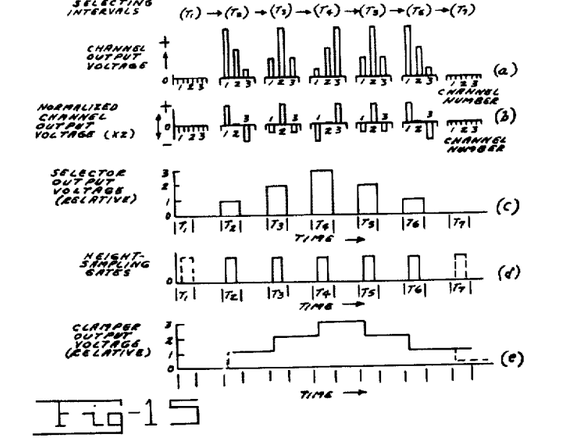
Fig. 15 is a diagram illustrating the principles of operation of the spectrum segmentation formant extractor.

The operation of the maximum selector is illustrated in Fig. 15 at (a), (b) and (c). Fig. 15(a) represents the output voltages of three arbitrary filter channels during seven successive time intervals. In the first time interval ($T_1$) no output has appeared. In the second interval ($T_2$) a filter output has appeared and channel number one has the maximum value. In the following intervals, the maximum moves successively from channel one to two; from two to three; from three back to two; and from two back to one. Fig. 15(b) shows the normalized values of the channel voltages during the same successive selecting intervals. Fig. 15(c) assumes that the maximum selector is selecting from these channels and shows its output as a function of time during the same succession of selecting intervals.

Figure 13:
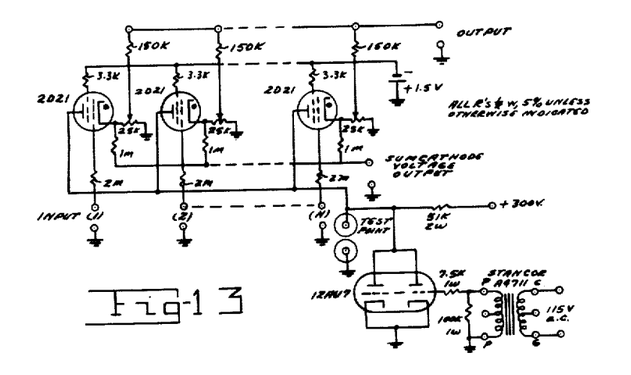
Fig. 13 is a circuit diagram of the thyratron maximum amplitude selector of the spectrum segmentation formant extractor.
Figure 14:
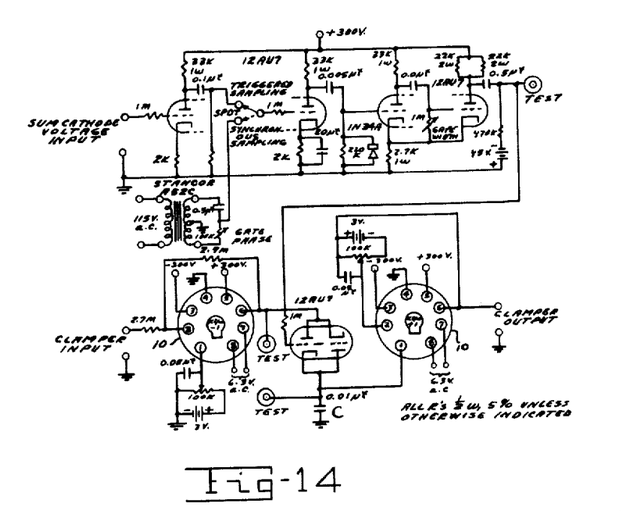
Fig. 14 is a circuit diagram of the clamper circuits of the spectrum segmentation formant extractor.

The clamper circuit disclosed in Fig. 14 uses the summed cathode voltage output from the circuit of Fig. 13 to synchronize a one-shot multivibrator with the output pulses from the maximum selector. The one-shot multivibrator generates a gate pulse each time a thyratron in the selector fires, as illustrated in Fig. 15(d). The output of the selector circuit of Fig. 13 is fed into the clamper input. The heights of the successive output pulses from the selector are read by the gate pulses. The voltage that is read is stored and held in the condenser C of the clamper circuit until the next sampling occurs. The clamper output is therefore a "staircase" smoothing of the outputs of the three clampers pulses from the selector and is shown in Fig. 15(e). The output can be further smoothed by passive low pass networks to obtain smooth voltages representing the three formant frequencies (i.e., $F_1(t)$, $F_2(t)$, and $F_3(t)$.

The height-sampling gates can be generated in two ways; "triggered" or "synchronous." During triggered sampling the height reading gate is generated only if the thyratron selector is making selection. The trigger is derived from summation without weighting of the thyratron cathode voltages and the gate "reads" each time any thyratron in a given selector fires.

During synchronous sampling, the height reading gate is generated in synchronism with enabling plate voltage of the thyratron set. It reads, therefore, regardless of whether or not any thyratron fires. If a thyratron is not fired, the gate reads the value zero, and this appears at the clamper output. The dotted portions of the curve in Figs. 15(d) and 15(e) indicate the results obtained by synchronous sampling. The S.P.D.T. switch in Fig. 14 provides means for interchangeable sampling.

The method of sampling determines the manner in which the clamper output voltage is extrapolated. With triggered sampling the clamper holds the last value of voltage read when the thyratrons were selecting and firing. It looses its value relatively slowly, returning to zero or to a neutral voltage with a time constant of approximately ¼ second. With synchronous sampling, the output voltage goes to zero in the enabling interval immediately following the last selection of the thyratron. Therefore, if one wishes to extract formant signals which are extrapolated smoothly across silent consonant intervals, the triggered sampling yields the best results.

Figure 16:
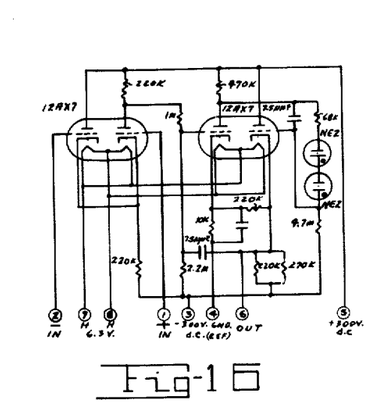
Fig. 16 is a circuit diagram of the Philbrick model K2W plug-in amplifier used in this device.
Figure 17:
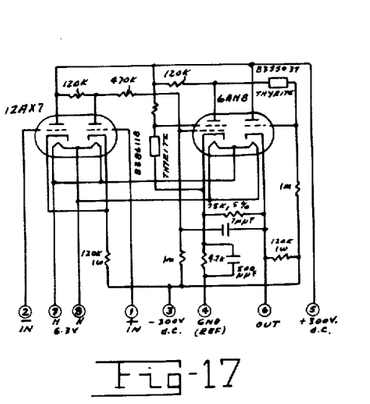
Fig. 17 is a circuit diagram of the Philbrick model K2X amplifier used in this device.

Figs. 16 and 17 represent the circuit diagrams of standard plug in type Philbrick D.C. amplifier models K2W and K2X, respectively. These amplifiers have open loop gains of 15,000 and 30,000, respectively. The K2W amplifier is capable of producing a maximum output voltage of ±50 v. D.C. across 50 kilohms and has a bandwidth of over 100 k.c.p.s. when used as an inverter. The K2X unit is capable of producing a maximum output voltage of ±100 v. D.C. across 33 kilohms and has a bandwidth of over 250 k.c.p.s. when used as an inverter. Circuit diagrams for the K2W and K2X units are shown in Figs. 16 and 17, as stated above. Both of these units fit into conventional octal tube sockets designated in the circuit diagrams as 10 and external circuitry can be arranged to allow them to function as cathode follower, inverter, feedback amplifier differentiators, or integrators. In the present system these units were used as cathode followers (denoted as +1) or inverters (denoted as −1) or feedback amplifier (denoted as −G). In the circuit diagrams the large octal sockets with appropriate notations in the center represent points in the circuit where these plug in units were inserted.

The most advantageous feature of the spectrum segmentation system for extracting signals representing the formant frequencies of speech is that it is extremely stable and calibration can be matched to virtually any signal-valued formant frequency versus voltage characteristics. Selection of the formant control functions are made simultaneously and there is little likelihood of selection of a spurious formant.

It is recognized that the system disclosed herein is susceptible of wide variation and modification. In addition, the various circuit details are to be construed as illustrative rather than limiting and the scope of the invention is defined in the claims which follow.

I claim:

1. An apparatus of the class described comprising in combination, a plurality of contiguous bandpass filters having a common speech input and separate voltage outputs, said contiguous bandpass filters divided into a predetermined number of groups, each group containing one formant of human speech, selecting means connected to each group of bandpass filters for continuously selecting the bandpass filter in that group with the greatest voltage output vowel segmentation circuit means positioned between said common speech input and said plurality of filters comprising 300–800 cycles per second bandpass and band elimination circuits arranged in parallel and restricting passage of speech from the common speech input to said plurality of filters to well defined formant signals, and means connected to said selecting means for producing a signal which is functionally related to frequency-time variations of the formant in each of said groups of bandpass filters.

2. An apparatus of the class described comprising in combination, a plurality of contiguous bandpass filters having a common speech input and separate voltage outputs and including a vowel segmentation device at the common speech input and including a vowel segmentation device between said common speech input and said plurality of filters restricting passage of speech fed therefrom to signals in the 300–800 cycles per second range, frequency resolution means connected to each bandpass filter output to increase the frequency resolution between adjacent bandpass filters, frequency equalization means connected to the input of said bandpass filters to permit the channels of the filter set to operate at approximately the same signal level, said contiguous bandpass filters divided into a predetermined number of groups, each group containing substantially one formant, a normalizing network for each group of bandpass filters, the output voltage of the bandpass filters in each group connected to the normalizing network for that group, to produce a reliable selection of the maximum voltage over the dynamic operating range, a maximum voltage amplitude selector for each group, the output voltages of said normalizing network connected to said maximum voltage amplitude selector for the selection of the bandpass filter having the instantaneous highest voltage, and means connected to the instantaneous output of the maximum voltage amplitude selector for producing a signal which is functionally related to frequency-time variations of the formant in each of said groups of bandpass filters.

3. The apparatus set forth in claim 2 wherein each bandpass filter comprises a simple tuned circuit, an amplifier, a full wave rectifier and a smoothing network, said vowel segmentation device comprising bandpass and band elimination channels in the range of 300–800 cycles per second connected in parallel and receiving speech signals from the common speech input, a resistive network receiving and subtracting smooth rectified outputs from said bandpass and band elimination channels, a clipper circuit receiving the difference between the smooth rectified outputs of said bandpass and band elimination channels from said resistive network, and a multivibrator triggered on receiving the clipped difference applied thereto by said clipper circuit and feeding segmented speech signals to the input of said plurality of filters.

4. An apparatus of the class described comprising a plurality of contiguous bandpass filters set up on the Koenig frequency scale comprising a frequency scale extending from 150 cycles per second to 7000 cycles per second and having channel bandwidths of 100 cycles per second to below 1550 cycles per second and increasing logarithmically above 1550 cycles per second, adjacent channels overlapped at their half power frequency means for independently adjusting the gain and bandwidth of each channel, said bandpass filters divided into a predetermined number of groups, each group containing one formant of human speech and having a common speech input and separate voltage outputs, selecting means connected to each group of bandpass filters for continuously selecting the bandpass filter in that group with the greatest output, means connected to said selecting means for producing a signal which is functionally related to frequency-time variations of the formant in each of said groups of bandpass filters, a vowel segmenting apparatus in circuit between said common speech input and said plurality of bandpass filters comprising an electronic switch controlling the application of segmented speech signals delivered thereto to the common speech output, a multivibrator circuit on the input side of said electronic switch, a center peak clipper device in circuit with said multivibrator circuit for receiving the difference between predetermined smooth rectified outputs applied thereto and triggering said multivibrator circuit in accordance therewith, and a resistive network between the input of said clipper device and a pair of bandpass and band elimination channels connected in parallel for subtracting the difference between the smooth rectified outputs thereof and applying to the input of said clipper device.

References Cited in the file of this patent

UNITED STATES PATENTS

| | | |
|---|---|---|
| 2,098,956 | Dudley | Nov. 16, 1937 |
| 2,151,091 | Dudley | Mar. 21, 1939 |
| 2,458,227 | Vermeulen et al. | Jan. 4, 1949 |
| 2,705,742 | Miller | Apr. 5, 1955 |
| 2,810,787 | Di Toro et al. | Oct. 22, 1957 |
| 2,817,711 | Feldman | Dec. 24, 1957 |

UNITED STATES PATENT OFFICE
CERTIFICATE OF CORRECTION

Patent No. 2,938,079                                             May 24, 1960

James L. Flanagan

It is hereby certified that error appears in the printed specification of the above numbered patent requiring correction and that the said Letters Patent should read as corrected below.

Column 4, line 15, after "example," insert -- the --; line 47, for "Reserch" read -- Research --; same column 4, line 53, after "therefore," insert -- to provide a --; column 7, lines 36 to 38, strike out "at the common speech input and including a vowel segmentation device".

Signed and sealed this 8th day of November 1960.

(SEAL)
Attest:

KARL H. AXLINE                                                ROBERT C. WATSON
Attesting Officer                                           Commissioner of Patents